(12) United States Patent
Powell

(10) Patent No.: US 9,533,478 B2
(45) Date of Patent: Jan. 3, 2017

(54) WAX PAPER WITH HEAT TRANSFER STAMPS

(71) Applicant: Sekuworks, LLC, Harrison, OH (US)

(72) Inventor: Timothy J. Powell, Aurora, IN (US)

(73) Assignee: WRC Acquisition, LLC, Atlanta, GA (US)

( * ) Notice: Subject to any disclaimer, the term of this patent is extended or adjusted under 35 U.S.C. 154(b) by 135 days.

(21) Appl. No.: 14/466,273

(22) Filed: Aug. 22, 2014

(65) Prior Publication Data

US 2016/0055772 A1 Feb. 25, 2016

(51) Int. Cl.
*B41M 3/14* (2006.01)
*B42D 15/00* (2006.01)
*G09F 3/02* (2006.01)
*B32B 29/00* (2006.01)
*D21H 19/18* (2006.01)

(52) U.S. Cl.
CPC ............ *B32B 29/002* (2013.01); *B41M 3/14* (2013.01); *B42D 15/00* (2013.01); *D21H 19/18* (2013.01); *G09F 3/02* (2013.01); *B32B 2307/54* (2013.01); *B32B 2429/00* (2013.01)

(58) Field of Classification Search
CPC ............ B41M 3/14; B42D 15/00; G09F 3/02; G09F 2003/0202; G09F 2003/0204; G09F 2003/0213; G09F 2003/025; G09F 2003/0257; B32B 29/02; B32B 2429/00
USPC .............................. 428/32.79, 32.82; 283/71
See application file for complete search history.

(56) References Cited

U.S. PATENT DOCUMENTS 8,616,434 B2 * 12/2013 Wilen .................. B42D 5/025
229/300

* cited by examiner

*Primary Examiner* — Bruce H Hess
(74) *Attorney, Agent, or Firm* — Clayton, McKay & Bailey, PC

(57) ABSTRACT

Improved wax paper with thermal transfer stamps may allow for more effectively transferring detailed stamps onto objects. The wax paper may include a paper layer having a porosity of at least 3000 Gurley seconds and a wax layer with a thickness of at most six pounds per ream of the paper. Stamps may be printed face down on the wax layer, with the underside of the ink coated with heat-activated adhesive. By pressing the converted wax paper onto an object, applying a heating element to the paper side of the converted wax paper, and removing the object from contact with the converted wax paper, a stamp may more completely and reliably transfer onto the object with levels of detail not previously achievable, while cutting down on negative effects of wax bleed and paper tears.

20 Claims, 6 Drawing Sheets

WAX PAPER WITH HEAT TRANSFER STAMPS

DESCRIPTION OF THE EMBODIMENTS

Field of the Embodiments

The embodiments relate generally to waxed paper and, more specifically, to converted waxed paper having heat-transferrable stamps that can be placed on objects for authentication, compliance, tracking, and/or tax purposes.

Background

Stamps are often placed on commercial products for authentication, regulatory, or tax-related reasons. For example, the Federal government taxes cigarettes, and stamps are sold to ensure that the cigarette producer pays for the correct tax for each carton of cigarettes sold in public commerce. This may be done, for example, by causing the cigarette producer to purchase rolls of stamps from the Federal government, and apply a stamp to each cigarette pack within a carton. Because a cigarette pack cannot be sold without a stamp on it, this stamping technique ensures that the cigarette company pays the required taxes.

The stamps may also include watermarks or authentication mechanisms to prevent counterfeiting. The stamps may each include a unique serial number also, to allow for further tracking or detail in a compliance review. However, the ability to use heat transfer stamps to apply digital codes for such purposes has been limited by the reliability of the transfer and the limited ink resolution inherent in current wax papers.

Currently, stamps may be supplied on large rolls of wax paper such that the stamp may be disengaged by heating the paper, which also may activate the adhesive qualities of the stamp. This may allow for an automated stamping process on a large scale. For products with large volume, such as cigarette packs or cartons, it is important to rapidly apply the stamps to the product while also preventing waste of the purchased stamps and ensuring proper visibility once the stamp is applied.

However, current wax papers have several shortcomings. First, the transfer quality of the stamps from typical wax papers is not a large enough percentage for many digital and other potential uses. In particular, the stamp may not completely disengage from the paper when heated, causing partial stamping on the products. This can require re-stamping the product or may cause the stamp to be ineffective at its intended purpose (e.g., authentication, compliance, regulatory, etc.). Second, current wax papers do not provide an exacting wax surface that allows for micro text or other very high resolution printing. Third, current wax papers often "bleed" wax through the paper when heated, which can result in poor transfer. Fourth, the high tackiness (e.g., 150-250 grams per inch) of some waxes used in wax papers can cause the paper to stick to the iron or the object (e.g., cigarette pack), which may then end up ripping the roll of stamps, costing both time and money in the stamping process.

Therefore, a need exists for improved wax paper with heat transfer stamps.

SUMMARY

Embodiments described herein include a converted wax paper with heat-transferrable stamps and methods for making and using such converted wax paper. The converted wax paper may reduce incidents of stamp transfer failure, paper tears, and heating element failure due to wax residue in comparison to known techniques.

In one embodiment, the converted wax paper may include a paper layer having first and second sides and a paper porosity of at least 3000 Gurley seconds. The converted wax paper may further include a wax layer adhered to the first side of the paper layer, wherein the wax layer has a substantially uniform thickness of at most six pounds per ream of paper. The wax may have a minimal tackiness, such as at most 50 grams per inch in one embodiment, and at most 75 grams per inch in another embodiment.

Further, an embodiment may include a plurality of stamp members applied such that the wax layer is between the stamp members in the paper layer, each of the plurality being in a first orientation that is opposite to a second orientation upon stamp placement.

In another embodiment, the converted wax paper may include a protective layer applied to the wax layer, wherein the stamp layer is applied to the protective layer. In another embodiment, the wax layer itself serves as the protective layer. The wax layer may be comprised of paraffin wax in one embodiment.

In one embodiment, the paper layer is a bleached kraft paper having machine direction tensile strength of at least 19 lbs/inch and a cross direction tensile strength of at least 8 lbs/inch. The paper layer may also have a burst strength of at least 20 psi in one embodiment.

The converted wax paper may allow for transferring a stamp onto an object by receiving heat on the second side of the paper layer and conducting the heat to the wax layer to activate at least one of the stamp members. The heat may be between 320 and 380 degrees Fahrenheit in one embodiment to allow at least one stamp member to disengage from the converted wax paper and adhere to an object.

The stamps may, for example, include a tracking code, authenticate a product, and/or evidence payment of a tax on a product in an embodiment. Among other things, the converted wax paper may include a backwards watermark that includes at least some invisible elements that react to black light.

In another embodiment, a method for creating a converted wax paper including thermal transfer stamps, includes supplying a kraft paper having a porosity of at least 3000 Gurley seconds between first and second sides, and applying a wax layer to the first side of the kraft paper within a printing zone in a substantially uniform thickness of at most six pounds per ream of the kraft paper. Then, a plurality of stamps may be printed by applying ink such that each stamp is faced down on the wax layer, and applying a heat-activated adhesive to the bottom of the plurality of stamp members.

A method of applying heat transfer stamps from wax paper to a plurality of objects may include creating a converted wax paper such as those described above and herein, and applying adhesive to the exposed side of the stamps, pressing a first of the plurality of objects against the converted wax paper, applying a heating element to the kraft paper layer to cause the wax layer to melt at a first of the stamps, and removing the object from contact with the converted wax paper.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Reference will now be made in detail to the present exemplary embodiments, including examples illustrated in the accompanying drawings. Wherever possible, the same reference numbers will be used throughout the drawings to refer to the same or like parts.

In one embodiment, a converted wax paper is described that is less porous and includes a thinner layer of wax than prior wax papers that are used for stamping. However, the converted wax paper may still adequately transfer heat-activated stamps without tearing in a stamping machine. At the same time, embodiments herein may suffer less "bleed through" of the wax layer and have a lower wax tackiness, resulting in more controlled stamp transfers and less paper tears. Additionally, the converted wax paper described herein may allow for more detailed stamps because a thinner wax layer may allow for more detailed ink printing.

These benefits may be achieved while sustaining an adequately strong converted wax paper in one embodiment by decreasing paper porousness while utilizing a thinner layer of wax. For example, whereas typical wax paper has a paper porosity of around 100 Gurley seconds, a wax thickness of 9.3 pounds per ream, and a wax tack of around 30-40 grams per inch, an embodiment herein may have a paper porousness of at least 3000 Gurley seconds, a wax thickness of at most 6 pounds per ream, and a wax tack of around 50 grams per inch.

As used herein, the term "converted wax paper" indicates that at least one heat transfer stamp has been printed, adhered, placed or otherwise formed on or in the wax paper.

Figure 1:
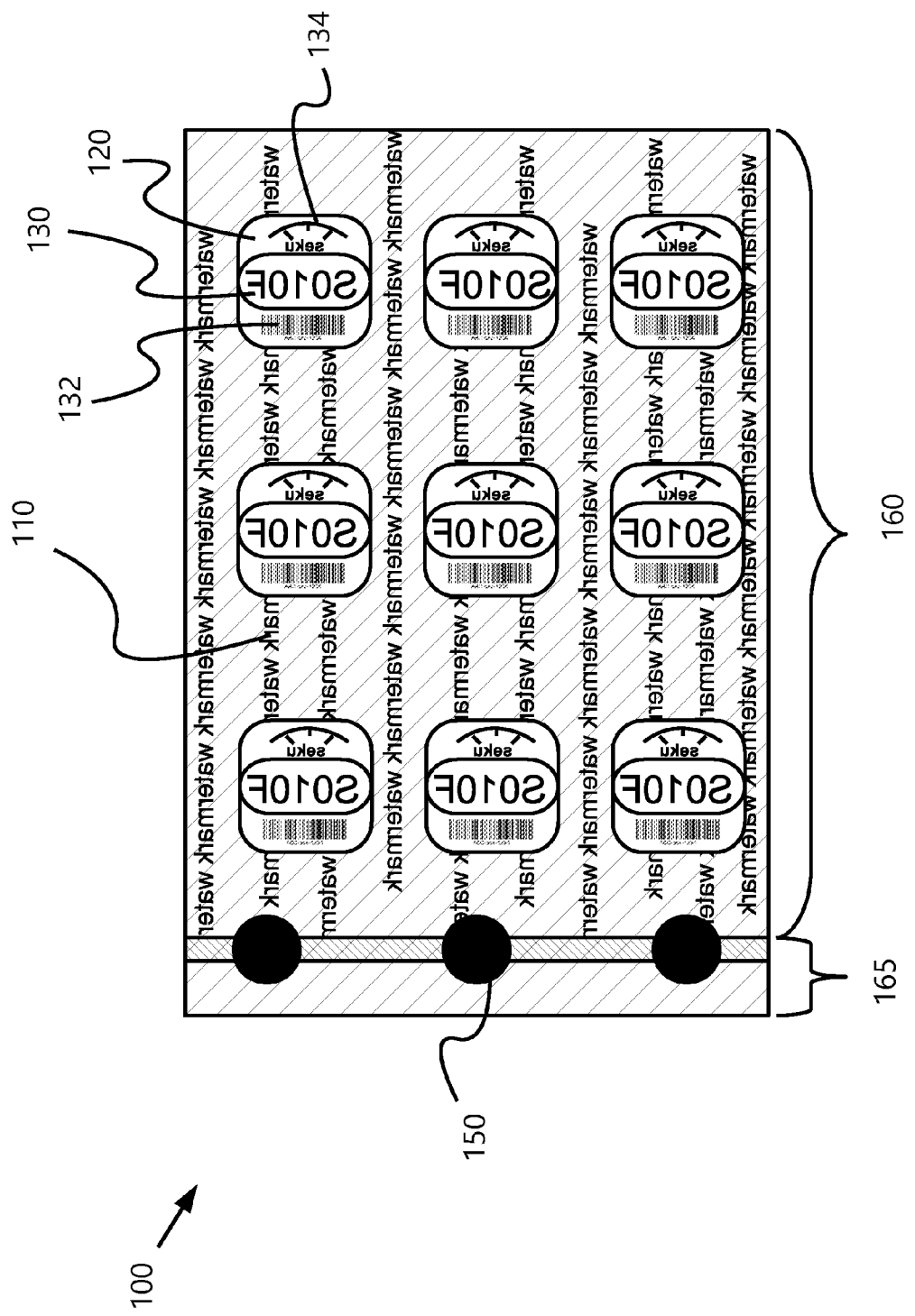
FIG. 1 is an exemplary illustration of a converted wax paper that includes a plurality of heat-activated stamps, in accordance with an embodiment.

FIG. 1 is an exemplary illustration of a converted wax paper 100 that includes a plurality of heat-activated stamps 120, in accordance with an embodiment. The converted wax paper 100 may contain at least a paper layer, a wax layer, and stamps 120.

The stamps 120 may be printed in ink onto the wax layer of the wax paper 100 such that the side of the stamp that is intended for human inspection is actually printed downward into the wax layer. As illustrated, the stamp 120 may be printed such that text or other information appears backwards while the stamp 120 is adhered to the wax paper 100. This backwards orientation may allow the stamp 120 to display with correct orientation once it is transferred onto an object, because the side that is visible on the wax paper 100 will adhere to the object, revealing the other side as visible on the object.

In another embodiment, the wax paper further includes adhesive that is deposited onto the ink of the stamp 120. Alternatively, the ink that forms the stamp 120 may itself have some heat-activated adhesive qualities. The adhesive may allow the stamp to stick to an object and, when the wax layer melts, transfer to the object from the wax paper 100 since the adherence of the adhesive will exceed that of the melted wax.

In one embodiment, the adhesive may be a water-based printable heat activated adhesive that activates and becomes tacky within a 0.08-0.20 second dwell period from a stamping iron with a temperature in the range of 320° F. to 380° F. The adhesive may setup and become rigidly adhered in less than 0.5 seconds in one embodiment. This may allow the adhesive to rigidly adhere fast enough to ensure objects can be moved quickly through a stamping machine, such as prior to carton flaps closing on the stamping machine. The adhesion of the stamp may be tested using 3M 610 Test Tape. For example, in one such testing scenario, the tape must not remove the stamp in its entirety and the stamp must only flake off small pieces.

In addition, the wax paper 100 may include a watermark 110 that is printed on the wax layer, paper layer, and/or protective layer. The watermark 110 may be printed prior to the stamps 134 in one embodiment so that it will appear on top of the stamp once transferred onto an object. For this reason, the watermark 110 may also be printed backwards onto the wax paper 110 so that it will display forwards once a stamp 120 is transferred to an object.

The watermark may serve multiple purposes in one embodiment. For example, it may assist in determining that a roll of wax paper 110 is authentic. It may also or alternatively assist in allowing a user to determine that a transferred stamp is authentic, because the stamp may contain a portion of the watermark 110 on the viewable side of the stamp 120 once the stamp is transferred on the object. As stated before, the later benefit may be accomplished, for example, by printing the watermark 110 backwards prior to printing the stamps 120.

In one embodiment, the ink detail of the stamps 120 and/or watermark 110 may be increased based on a relatively thin wax layer. By using less wax in embodiments herein, the wax paper 110 may include a smoother wax surface, which in turn may lead to sharper and cleaner printing potential. This may also provide new uses for the stamps by inclusion of higher detail micro text and digital codes.

Each stamp may include a logo 134 indicating a source of the stamp 120 in one embodiment. In another embodiment, an identification number 130 may be presented on the stamp 120 to allow an owner or authority to authenticate or verify some aspect of the object baring the stamp. For example, the stamps may be purchased and placed on objects, such as cigarette cartons, to indicate an applicable tax has been paid for the object. The identification number 130 may be used to track the stamp roll used on the object in one such embodiment.

In another embodiment, each printed stamp 120 may include a machine readable code 132 (i.e., digital code), making the stamp a digital stamp. The machine readable code 132 may be a barcode in one embodiment. In another embodiment, it may be a QR code. The machine-readable code may be possible based on the increased stamp resolution of wax paper 100 embodiments described herein.

In yet another embodiment, some portion or all of the stamp 120 and/or the watermark 110 may be printed in invisible ink. This may allow for some portion of the stamp and/or watermark to be revealed with special light frequencies, such as with a black light. In one embodiment, a digital code is printed with invisible ink, and is read by a computer that uses the correct frequency light to detect the invisible ink code.

As shown in FIG. 1, the stamps 120 may be included in a plurality of rows on the wax paper 100. In one embodiment, multiple rows of stamps 120 may allow for the simultaneous transfer of multiple stamps to multiple objects based on orienting the stamps to align with an anticipated orientation of multiple items that may be stamped at once with a stamping machine.

In one embodiment, the plurality of stamps are all printed within a printing zone 160 that may span only a portion of the wax paper 100. The remaining portion 165 may be kept free of stamps 120, for example, to prevent the stamps from being too close to components of the stamping machine, which could potentially ruin the stamps. For example, spooling holes 150 may be used by the stamping machine to feed the wax paper 100 into the stamping machine and position the paper at the heating element for transferring at least one stamp 120 onto an object, such as a cigarette carton. If the printing zone 160 expands over such spooling holes 150, then the stamps may be inadvertently damaged by the spooler in one embodiment.

In another embodiment, the printing zone spans the entire wax paper 160.

In still another embodiment, an additional invisible watermark may be supplied outside the stamp printing zone 160 for authenticating the roll of wax paper 100.

Figure 2:
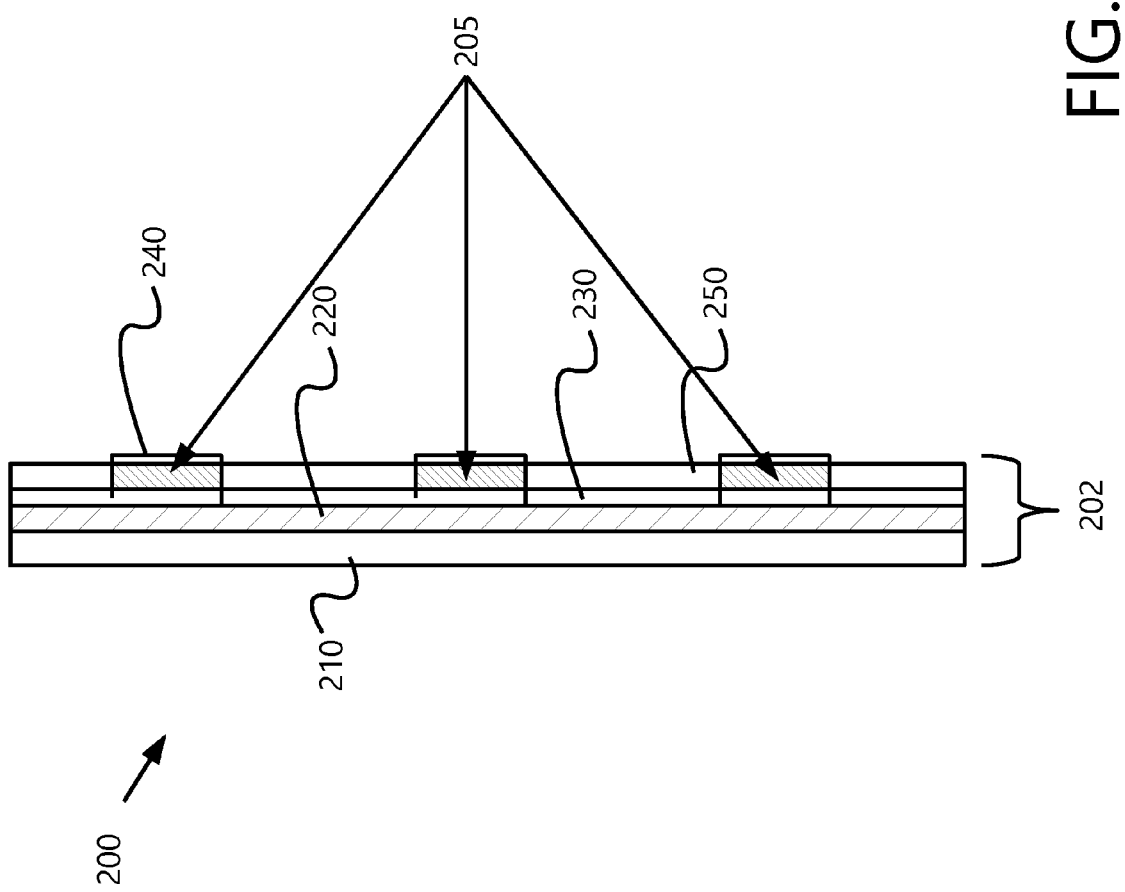
FIG. 2 is an exemplary illustration of a profile view of waxed paper with stamps, in accordance with an embodiment.

Turning to FIG. 2, an exemplary cross-sectional illustration of waxed paper 200 with stamps at stamp locations 205 is shown, in accordance with an embodiment. As shown, the wax paper 200 may be comprised of multiple layers 202 of material in one embodiment.

Working from left to right, the first layer may be a paper layer 210, and the second layer may be a wax layer 220.

The paper layer 210 may differ from the paper portion of prior wax papers used for heat transfer of stamps in several ways. First, the paper layer may have a low porosity by comparison. For example, in one embodiment the paper has a porosity of at least 3000 Gurley seconds. The Gurley method may essentially consist of passing air through a paper at a specified pressure of 1.22 kPa, and measuring how long it takes to displace 100 mL of air through the paper. Until now, wax paper used for thermal transfer of stamps has typically utilized much higher porosity paper, such as a paper with 100 Gurley seconds. Thus, the paper layer may be at least 30 times less porous than a typical paper layer of existing wax paper. Further description of the Gurley method made be found in the T 460 test papers promulgated by the TAPPI organization.

By reducing porosity, the paper layer may better withstand melted wax seeping through the paper pores, keeping more of the wax layer on the face of the sheet, which in turn helps create a uniform consistent release from the paper when heated. This may also reduce a problem common with current wax papers with high wax tack (e.g., 150-250 grams per inch), which can cause the heating element to become tacky and, in some scenarios, tear the roll of wax paper 200, which wastes stamps, slows the stamping process, and requires human maintenance and intervention.

The low paper porosity may be achieved in one embodiment while using a 30# bleached kraft paper for the paper layer. The paper may be generally lighter than, for example, 33# paper found in common wax papers. The paper may have a relatively low cross directional tensile strength of 8 pounds per inch (i.e., lbs/in.), while maintaining a machine direction tensile strength of 19 lbs/in., and a burst of 20 psi. With these attributes, the paper layer 210 is strong enough for the converted wax paper 200 to resist tearing while being used within a stamp machine.

The paper layer may be finished in one embodiment with a supercalendering process to make the paper smooth, which in turn may allow for a smoother wax layer for accepting ink printing.

The wax layer 220 may be half the width of common wax paper used for stamp transfer, in one embodiment. For example, the wax layer may have a thickness of at most 6 pounds per ream of paper layer in one embodiment.

The wax may be a paraffin wax in one embodiment. The wax may be chosen to have a tackiness of around 50 grams per inch based on adhesion release tests with cellophane in one embodiment, and at most 75 grams per inch in another embodiment. This higher tack value may help ensure adequate transfer despite less wax being present, and also be low enough to prevent paper tears in the low porosity and relatively thin paper layer. And with the thinner wax layer, lower tack levels are not needed to prevent failures within the wax layer itself peeling away.

The wax tack may be measured and tested with an adhesion release tester. For example, a motorized sled with a clamp and load cell may measure the force it takes to peel the wax off. In particular, the wax may be applied and adhered to cellophane, and then peeled off by the adhesion release tester to determine the grams per inch required to perform the peel.

In one embodiment, reducing wax thickness in conjunction with the lower paper porosity may have several benefits. First, by including less wax, the heat transfer process generally may melt the wax more uniformly and allow for a cleaner and more controlled stamp transfer. In contrast, current techniques often result in higher levels of inconsistent stamp transfer (i.e., less than 90% of the stamp actually transferring) because thicker wax may melt at a less consistent rate at different points within the full area of a stamp. As a result, a piece of the stamp may remain with the stamp paper rather than transferring to the object. An embodiment having a wax layer of at most 6 pounds per ream may substantially reduce this problem, and a wax tack of about 50 grams per inch may additionally ensure that the wax transfers while also not being so tacky as to provide false transfers of the relatively thin layer of wax.

Second, by reducing the thickness of the wax, higher definition ink printing may be possible. This is because wax generally forms a rough and imperfect layer, which limits the reliable detail of printing on the surface. By reducing the wax thickness, the detail available on an embodiment herein may be dramatically better than prior methods, analogous to the difference between high definition television versus standard definition. In general, smaller micro text and higher precision tags are possible in an embodiment described herein.

The combination of increased detail and more reliable transfer synergistically may allow the stamps to carry computer-readable codes (i.e., digital codes), such as QR or bar codes, in one embodiment. Such stamps may be considered digital stamps, and may be used for tracking the objects the digital stamps are transferred to.

In one embodiment, a third protective layer 230 may be applied to the wax layer 220. The protective layer 230 may be a lacquer or other coating applied to the wax in order to provide scuff resistance for the stamps. The protective layer 230 may act as a "backbone" of the stamp, better holding together the inks that are printed on the protective layer 230 and increasing the likelihood of the entire stamp transferring together to an object without tearing.

Next, the wax paper may be converted by printing at least one stamp onto it. In one embodiment, a layer of ink 250 may be printed on the protective layer 230. In another embodiment, the ink may be printed straight onto the wax layer 220. The ink layer 250 may be printed in multiple passes to build the stamps backwards at stamp locations 205. This may allow for thermal transfer to reveal the intended top side of the stamp once it is bonded to an object.

In one embodiment, a code (i.e., a number, identifier, or computer-readable code such as a QR or bar code), such as code 130 of FIG. 1, may first be printed onto the printing surface (e.g., the protective layer or the wax layer) at each stamp location 205. The code may be printed backwards so that it will display properly after transfer. The code may be the same for each stamp in one embodiment.

However, in another embodiment, the code may be unique for each stamp to allow each object to be uniquely identifiable. For instance, a unique digital code may be used for object tracking, such as by scanning the digital code and retrieving information from a database by using the digital code as a search key for retrieving the information.

After the code has been printed at each stamp location 205, a watermark may be printed in one embodiment. This may ensure that the code is visible and readable, but that some portion of the watermark will also transfer with the stamp. In another embodiment, the watermark may be printed prior to printing the code.

Next, security artwork may be printed at each stamp location 205. For example, a logo or other security feature, such as logo 134 of FIG. 1, may be printed at each stamp location 205.

Then a background color and/or other background details may be printed to fill in the boundaries of the stamp.

Finally, in one embodiment, an adhesive may be applied to the stamp locations 205. This may be a heat-activated adhesive. As described previously, in one embodiment the adhesive may be a water-based printable heat activated adhesive that activates and becomes tacky within a dwell period of 0.08 to 0.20 seconds from a stamping iron with a temperature in the range of 320° F. to 380° F. During transfer, the adhesive at the stamp locations 205 may activate and cause the stamp ink to transfer from the stamp locations 205 onto the object.

In this way, the stamps may be constructed backwards and the converted wax paper may be complete in one embodiment.

Figure 3:
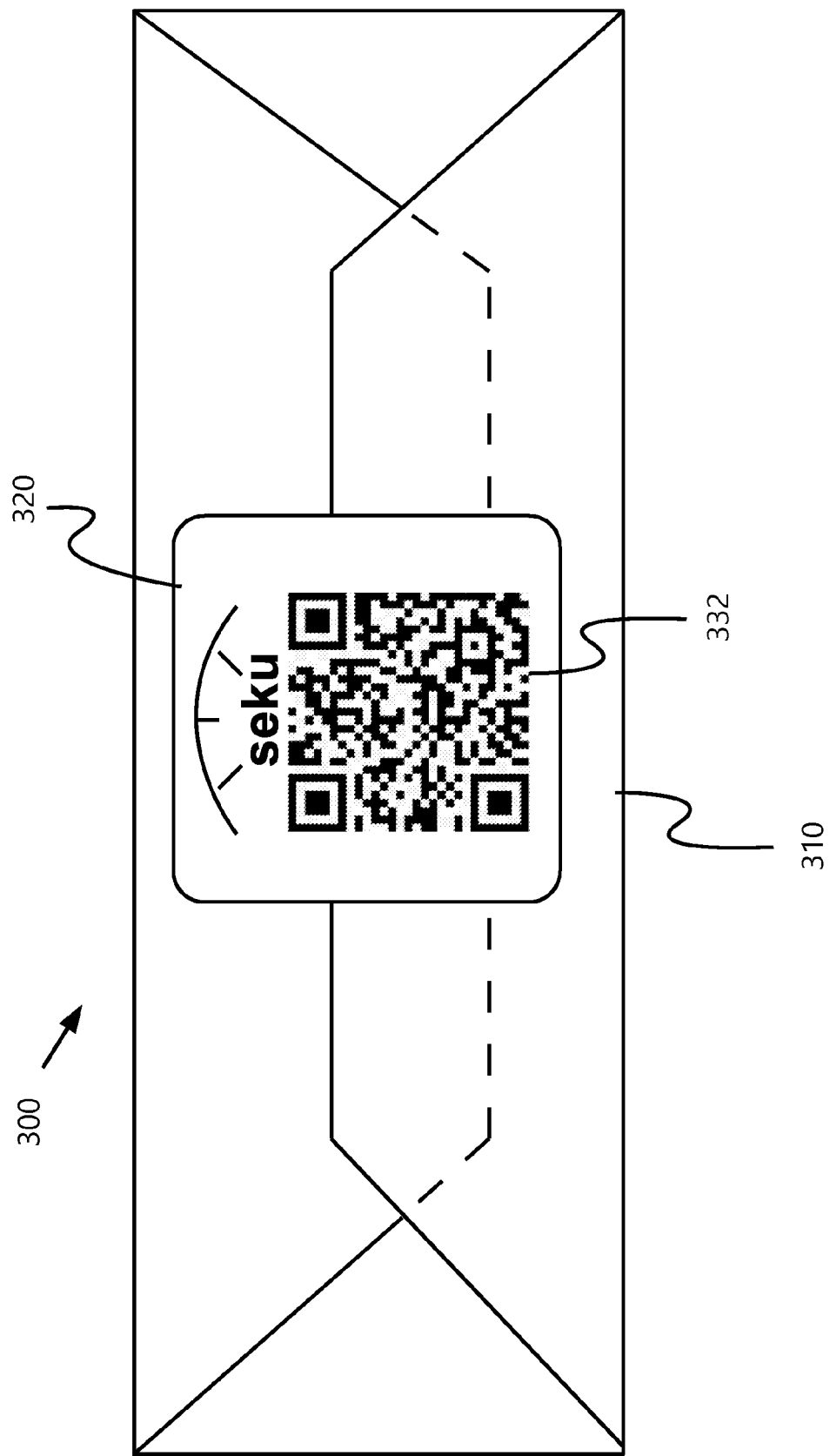
FIG. 3 is an exemplary illustration of a product carton with a stamp placed upon it from the waxed paper, in accordance with an embodiment.

FIG. 3 presents an exemplary illustration of the bottom of object 300, which contains a stamp 320 that was transferred via a heat transfer process. In this example, object 300 may be a cigarette packet, and the stamp may be adhered to the bottom of a cellophane wrapper.

As shown, the stamp 120 may include a digital code, such as a QR code, that may be scanned and used for object tracking. Heat transfer of the digital code may be possible in accordance with an embodiment herein based on the decreased transfer failure rate combined with the higher resolution printing possible. Each time the object 300 is inventoried at a warehouse, loaded onto a truck, and/or placed into inventory at a destination store, the digital code may be scanned and used by a backend system that tracks the object's 300 movements.

Figure 4:
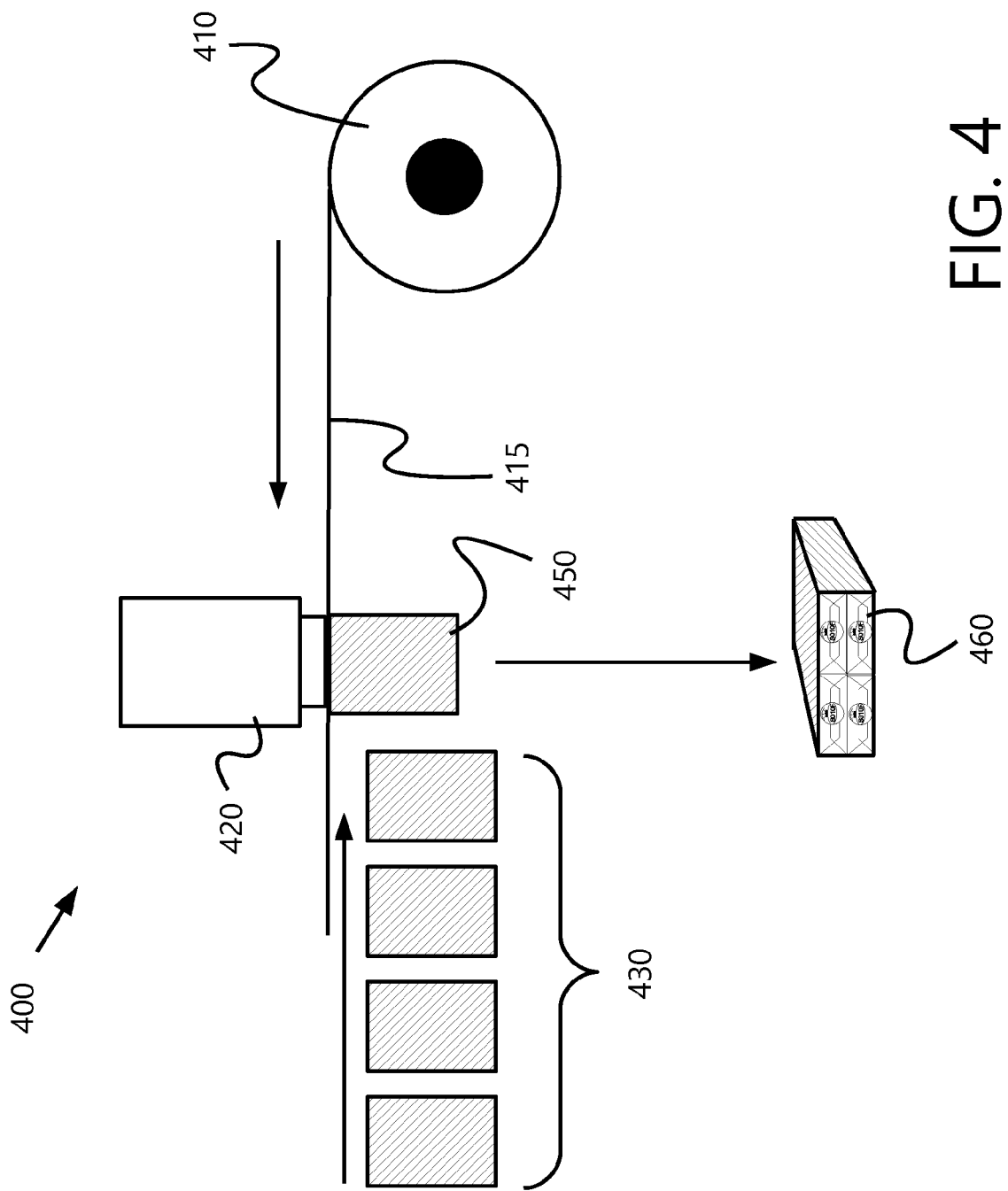
FIG. 4 is an exemplary illustration of a system for transferring a plurality of stamps from the waxed paper to products, in accordance with an embodiment.

Turning to FIG. 4, an exemplary system 400 that uses the converted wax paper 410 to transfer stamps onto objects 430 is illustrated. In particular, objects 430, such as cartons of cigarettes, may be loaded into a stamping machine along with a roll of converted wax paper 410, which contains thermal transfer stamps. A portion 415 of the roll of converted wax paper 410 may be fed past a heated iron 420, such that the iron 420 applies pressure to the back (non-wax side) of the paper layer, pushing a plurality of stamps onto cigarette packs inside an open carton 450.

This carton 450 may be ejected with a plurality of packs inside 460 now having been stamped. Although this example shows four packs were stamped simultaneously, greater or fewer numbers of simultaneous stamps may be applied in other embodiments. In general, the stamps are pre-oriented on the wax paper 115 to align with the correct number and relative locations of the objects onto which the stamps will be simultaneously applied. In one embodiment, stamps are instead applied one object at a time.

The next carton may then be loaded against the next plurality of stamps on the wax paper 410, and the iron may push another set of stamps on to the packs within the carton. This process may be repeated until all cartons have had their internal packs stamped.

Figure 5:
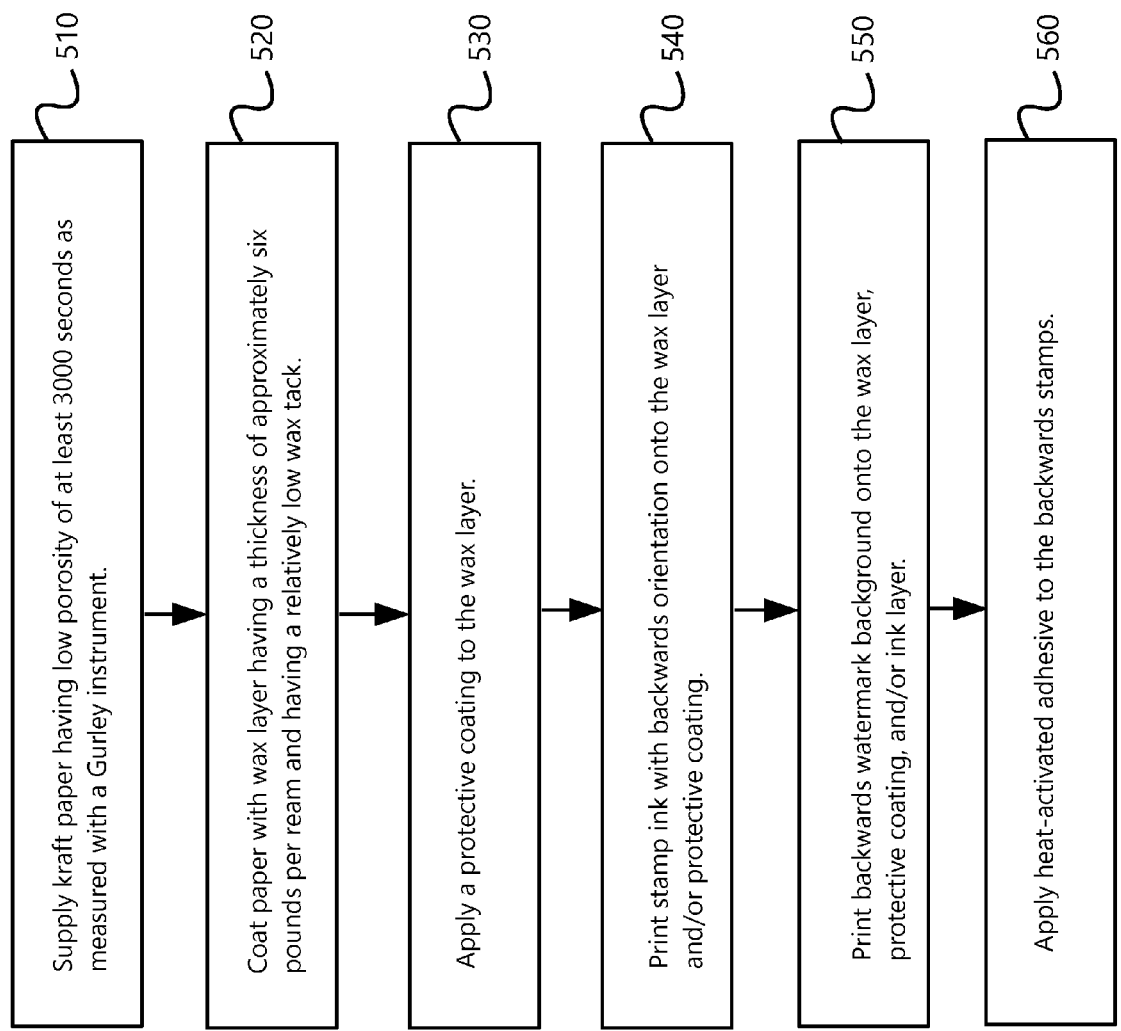
FIG. 5 is an exemplary flow chart for making waxed paper with heat-activated stamps, in accordance with an embodiment.

FIG. 5 is an exemplary flow chart for making converted waxed paper that contains heat transfer stamps, in accordance with an embodiment. At step 510, a manufacturer may supply kraft paper having low porosity of at least 3000 seconds as measured with a Gurley instrument. The paper may be finished via supercalendering for a smooth base for a wax layer in one embodiment.

At step 520, the paper may be coated with a wax layer having a thickness of approximately six pounds per ream of paper. The wax may be a paraffin wax in one embodiment, and have a wax tack of at most 50 grams per inch in one example. The maximum wax tack may be 75 grams per inch in another example.

At step 530, a protective coating may be applied to the wax layer. This may be a lacquer, and may provide support and definition to the areas where the stamp ink will be printed, decreasing chances of stamps only partially transferring.

At step 540, the stamp ink may be printed with a backwards orientation onto the protective coating and/or wax layer. Printing may be accomplished in multiple passes in one embodiment, printing the intended foreground features first and background features of the stamp last. For example, a digital code may be printed first to ensure that it will be readable once the stamp has been transferred.

At step 550, a watermark may be printed to the background of the protective coating and stamps. In one embodiment, step 550 occurs during or even before step 540, depending on whether the watermark should also appear in the foreground of the stamps. In one embodiment, the watermark is printed after digital codes so that digital codes sit on top.

At step 560, a heat-activated adhesive may be applied to the stamp ink, finishing the reverse construction of the stamps.

Figure 6:
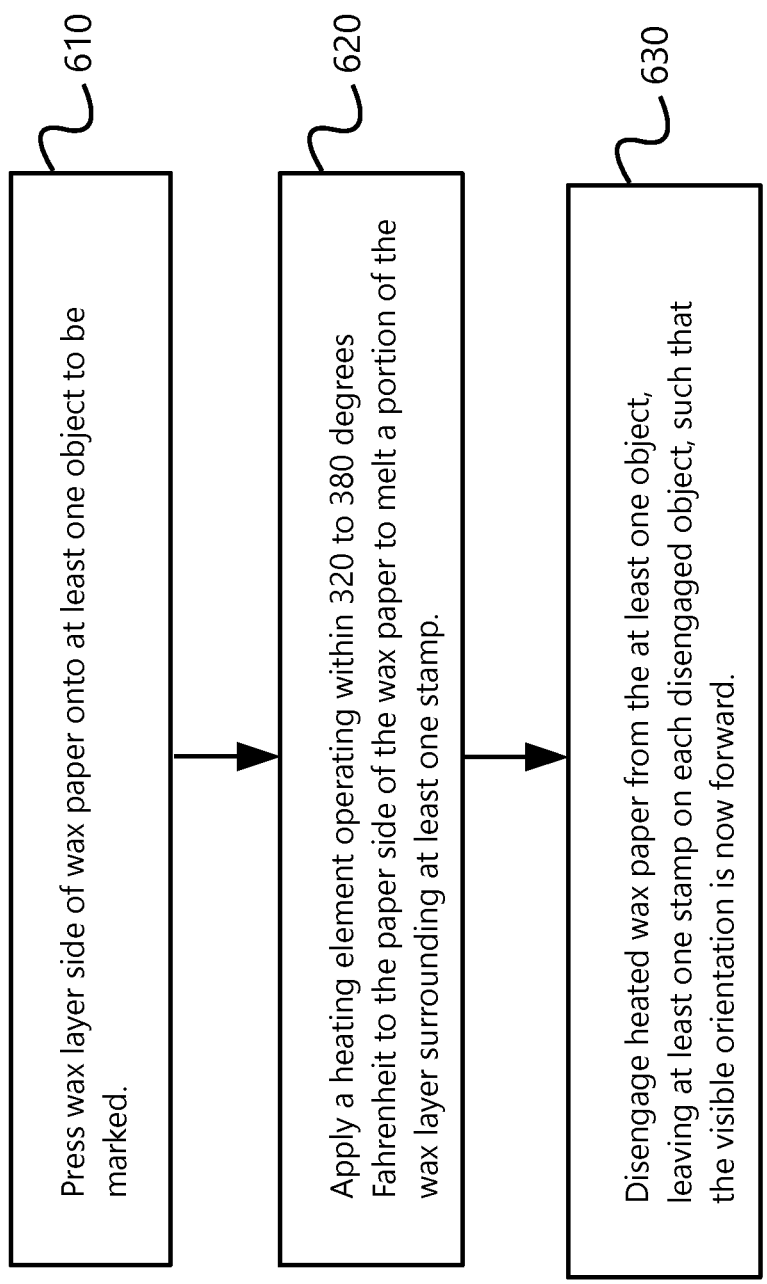
FIG. 6 is an exemplary flow chart for transferring stamps from the waxed paper onto a product, in accordance with an embodiment.

FIG. 6 is an exemplary flow chart for transferring stamps from the converted waxed paper onto a product, in accordance with an embodiment. At step 610, a stamp machine may press a wax layer side of the converted wax paper onto at least one object. As shown in FIG. 4, a single carton may contain a plurality of objects 460 that get stamped.

At step 620, the stamp machine may apply a heating element (such as iron 420 of FIG. 4) operating within 320 to 380 degrees Fahrenheit to the paper side of the converted wax paper. The heat then transfers through the paper to melt a portion of the wax layer residing between the paper layer and at least one stamp. The heat also may activate the adhesive at the base of the stamp, causing the stamp to simultaneously bond to the object while disengaging from the wax paper.

At step 630, the stamp machine may disengage heated wax paper from the at least one object, leaving at least one stamp on each disengaged object, such that the visible orientation is now forward. An example is illustrated in FIG. 4.

Although particular materials are mentioned as examples herein, these examples are not exhaustive. Other materials may be used to build a roll-up shelf in accordance with an embodiment herein.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A converted wax paper including heat-activated stamps, the converted wax paper including:
   a paper layer having first and second sides and a paper porosity of at least 3000 Gurley seconds;
   a wax layer adhered to the first side of the paper layer, wherein the wax layer has a substantially uniform thickness of at most six pounds per ream and a tackiness of at most 75 grams per inch;
   a plurality of stamp members applied such that the wax layer is between an ink portion of the stamp members and the paper layer, each of the plurality being in a first orientation that is opposite to a second orientation upon stamp placement,
   wherein the paper layer is configured to receive heat on the second side and conduct heat to the wax layer to activate at least one of the stamp members.

2. The wax stamp paper of claim 1, further including a protective layer applied to the wax layer, wherein the stamp layer is applied to the protective layer.

3. The wax stamp paper of claim 1, further including a backwards watermark applied such that the wax layer is between the watermark in the paper layer.

4. The wax stamp paper of claim 3, wherein the watermark includes at least some invisible elements that react to black light.

5. The wax stamp paper of claim 1, wherein heat between 320 and 380 degrees Fahrenheit activates the at least one stamp member.

6. The wax stamp paper of claim 1, wherein the wax layer is comprised of paraffin wax.

7. The wax stamp paper of claim 1, wherein the paper layer is a bleached kraft paper having machine direction tensile strength of at least 19 lbs/in and a cross direction tensile strength of at least 8 lbs/in.

8. The wax stamp paper of claim 1, wherein the paper layer has a burst strength of at least 20 psi.

9. The wax stamp paper of claim 1, wherein the stamp members each include a digital code configured to be read by a machine.

10. The wax stamp paper of claim 1, wherein the paper layer is a bleached kraft paper having machine direction tensile strength of at least 19 lbs/in, a cross direction tensile strength of at least 8 lbs/in, and a burst strength of at least 20 psi.

11. A method for creating a converted wax paper including thermal transfer stamps, the method including:
   supplying a kraft paper having a porosity of at least 3000 Gurley seconds between first and second sides;
   applying a wax layer to the first side of the kraft paper within a printing zone in a substantially uniform thickness of at most six pounds per ream of the kraft paper;
   printing a plurality of stamps on the wax layer within the printing zone, such that the wax layer is between the plurality of stamps and the kraft paper, wherein the printing includes by applying ink to form each stamp, wherein each stamp is faced down on the wax layer; and
   applying a heat-activated adhesive to the bottom of the plurality of stamp members.

12. The method of claim 11, wherein the supplied kraft paper has a paper weight of 30#.

13. The method of claim 11, wherein applying the wax layer includes applying a paraffin wax having a wax tack of at most 75 grams per inch.

14. The method of claim 11, wherein applying the wax layer includes rolling heated liquid wax onto the first side of the kraft paper.

15. The method of claim 11, wherein printing the plurality of stamps includes applying both visible and invisible ink, the invisible ink being detectable with a black light.

16. The method of claim 11, further including printing a watermark backwards on the wax layer within the printing zone before printing the plurality of stamps, such that the watermark is between the wax layer and the plurality of stamps after the plurality of stamps are printed.

17. The method of claim 11, wherein the stamps include unique machine-readable codes.

18. A method of applying heat transfer stamps from wax paper to a plurality of objects, including:
   creating a converted wax paper by at least:
     coating a kraft paper layer having a porosity of at least 3000 Gurley seconds with a wax layer, the coating distributing the wax layer substantially uniformly and with a weight of at most six pounds per ream of the kraft paper;
     printing the stamps face down onto the wax layer such that a reverse side of the stamp is exposed and a display side of the stamp is against the wax layer; and
     applying adhesive to the exposed side of the stamps;
   pressing a first of the plurality of objects against the converted wax paper;
   applying a heating element to the kraft paper layer to cause the wax layer to melt at a first of the stamps; and
   removing the object from contact with the converted wax paper.

19. The method of claim 18, wherein the heating element operates at a temperature within the range of 300 to 380 degrees Fahrenheit.

20. The method of claim 18, wherein the wax layer applied is a paraffin wax having a tackiness of at most 50 grams per inch.

* * * * *